May 16, 1961     C. B. TURTON     2,984,769
PLUG-IN TYPE BUSWAY WITH INTERLOCKING PLUG
Filed Sept. 5, 1958     3 Sheets-Sheet 1
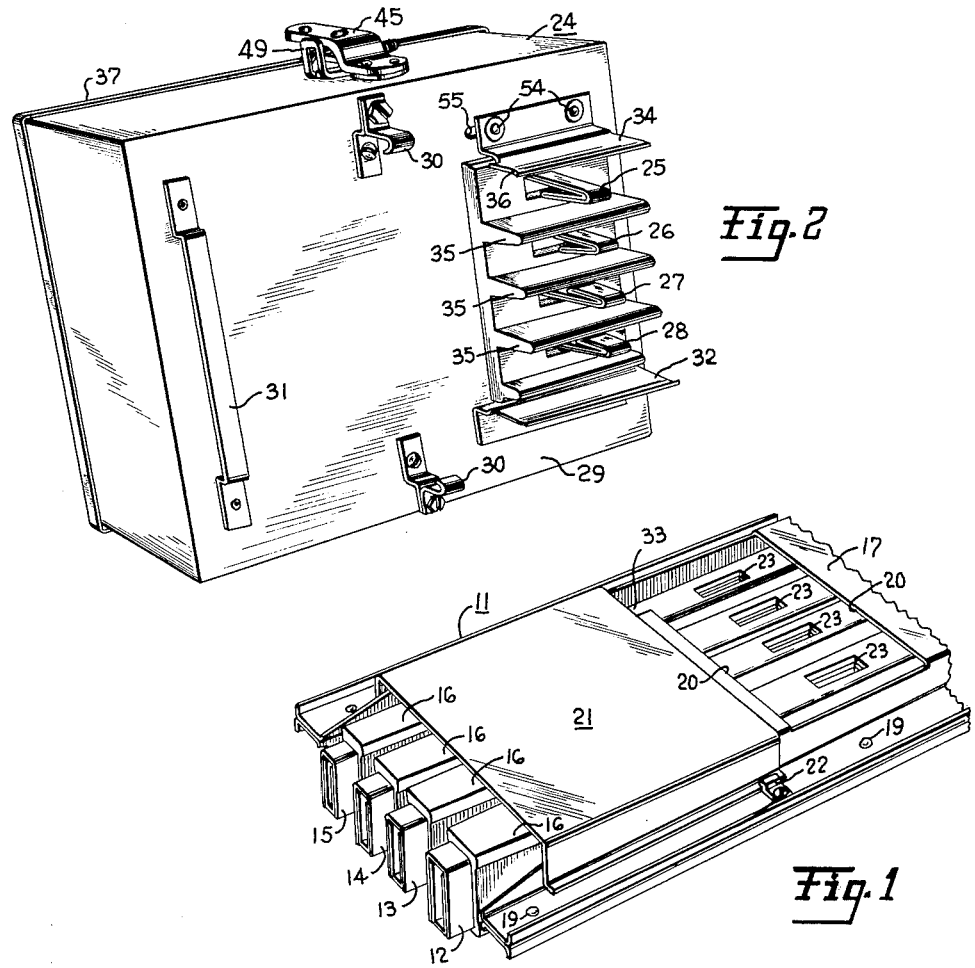
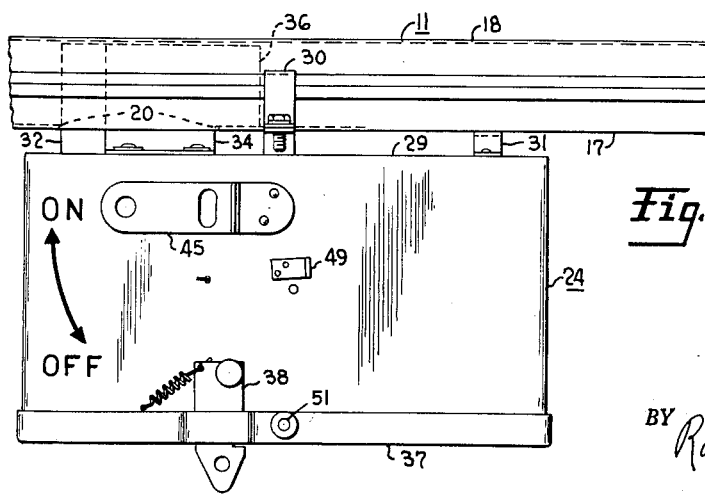
*INVENTOR.*
CECIL B. TURTON
BY *Robert H. Casey*
ATTORNEY

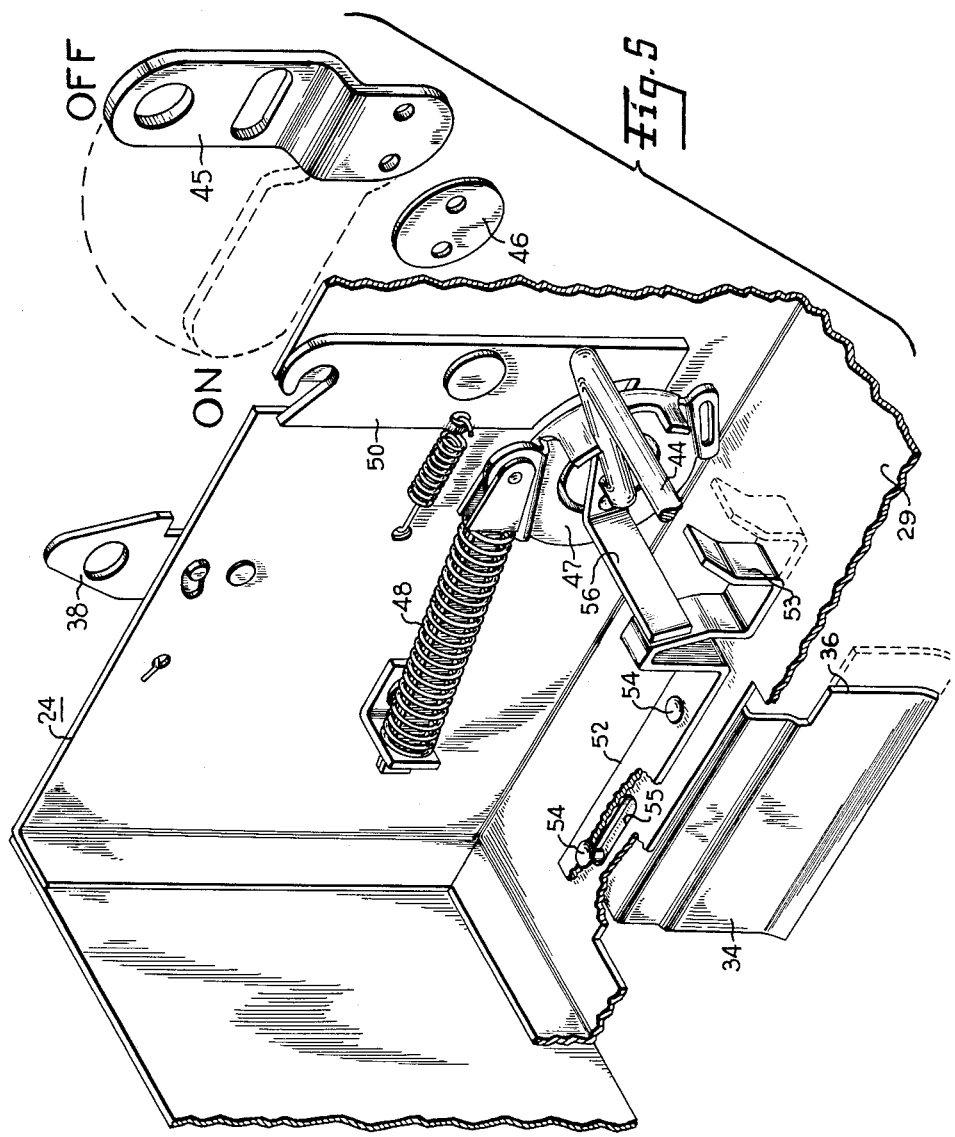

United States Patent Office 2,984,769
Patented May 16, 1961

2,984,769

PLUG-IN TYPE BUSWAY WITH INTERLOCKING PLUG

Cecil B. Turton, Burlington, Conn., assignor to General Electric Company, a corporation of New York Filed Sept. 5, 1958, Ser. No. 759,353

8 Claims. (Cl. 317—120)

This invention relates to electric power distribution systems, and more particularly it relates to an electric power busway having plug-in type power take-off devices or plugs which interlock with the busway to prevent insertion and/or removal while the plug is in a predetermined condition.

Bus bar distribution systems, commonly referred to as busways, are used for the safe and efficient distribution of multiphase electric power in industrial plants, office buildings and the like. In essence a busway comprises a plurality of elongated electrical conductors or bus bars connected for energization to the respective phases of a polyphase electric power source and enclosed in a grounded metal unit or housing. The bus bars are supported in side-by-side, spaced-apart relation within the metal housing, and suitable insulation is provided to ensure that each phase is electrically isolated from the other phases and from ground. Plug-in type busways are busways having provisions at spaced intervals for the convenient connection of removable metal units enclosing power tap-off devices such as safety switches, circuit breakers, fuses, or the like, the purpose of each tap-off unit being to control the supply of electric power to a particular utilization circuit. Such a tap-off unit is removably mounted on the busway housing, and the tap-off device enclosed therein is connected to the electric power source by means of suitable plug-in type disconnect contacts disposed to engage cooperating uninsulated portions of the respective bus bars.

In order to obtain desirable flexibility and convenience, plug-in type busways conventionally are designed for quick and easy mounting and dismounting of interchangeable power tap-off units. The cooperating disconnect contacts which establish electrical connection between each tap-off device and the bus bars of the busway are not ordinarily designed to perform a current interrupting function, and therefore it is important that the utilization circuit be deenergized when engagement or disengagement of the disconnect contacts is effected. One known way of assuring that the utilization circuit is open and deenergized while electrical connection is being made or broken between the tap-off device and the busway is to provide a tap-off unit having so-called "retractable disconnects." With such an arrangement, the tap-off unit it securely mounted on or removed from the busway housing with the disconnects of the unit in a retracted position, and the mechanism for extending the disconnects into engagement with the bus bars is interlocked in a suitable manner to ensure that it cannot be effectively operated unless the utilization circuit is first disconnected by other suitable means. Such an arrangement, while successfully accomplishing the intended object, is not completely satisfactory from the point of view of structural simplicity and low manufacturing cost.

A different method of assuring that deenergization of the utilization circuit is not effected by electrical disconnection of the tap-off device is exemplified by Patent 2,173,062 issued to Herman J. Hammerly on September 12, 1939. Here a movable guard member on the tap-off unit is disposed to fit over the head of a fastening screw by which the tap-off unit is secured to the busway housing, thereby preventing removal of the unit. The guard is interlocked with the operating mechanism of the tap-off device (such as the fused safety switch illustrated in the Hammerly patent) so that it can be moved and thereby provide access to the fastening screw only when the operating mechanism is turned to an "off" or open circuit position. By thus preventing dismounting or removal of the tap-off unit until the utilization circuit has been deenergzed, the plug-in disconnect contacts, which are of a non-retractable type and are separated from the bus bars by the act of dismounting the unit, will be relieved of current interrupting duty. However, such an arrangement is deficient in that it obviously will not prevent the accidental connection of the tap-off unit to the busway with the operating mechanism in an "on" or closed circuit position.

Accordingly, it is an object of the present invention to provide an improved interlock for a plug-in type electric power busway by means of which non-retractable type disconects can be prevented from making or breaking an energized or live circuit during mounting or dismounting of a power tap-off unit.

A general object of the invention is to provide in an electric power distribution system a simple and inexpensive yet relatively fool-proof interlock for positively preventing the mounting and dismounting of a removable tap-off unit with respect to a relatively stationary housing under preselected conditions.

Still another object is the provision of an interlock for a polyphase plug-in type busway that serves as a simple but effective means for preventing the connection of an improperly oriented tap-off unit to the busway.

In carrying out my invention in one form, I provide a plug-in type electric busway comprising a relatively stationary unit housing a source of electric power and a removable unit housing a tap-off device. The removable unit is movable along a predetermined course for mounting and dismounting with respect to the source unit, and the respective units are provided with cooperating disconnect contacts of conventional construction. A first interlock element is mounted on the removable unit for movement between two different positions in a plane generally perpendicular to the aforesaid predetermined course, and suitable actuating means is connected to this interlock element for controlling its movement. A second cooperating interlock element is fixedly associated with the relatively stationary unit. One of the interlock elements comprises a cantilever member projecting generally parallel to the predetermined course and having an enlarged free end, while the other interlock element comprises a plate having an aperture for admitting the entire enlarged end of the cantilever member. The interlock elements are disposed with respect to each other so that the enlarged end of the cantilever member registers with and passes through the aperture of the plate during mounting and dismounting of the removable unit whenever the first interlock element is in a predetermined one of its two positions. However, upon movement of the first interlock element to its other position, the enlarged end of the cantilever member will be out of register with the aperture thereby preventing mounting or dismounting of the removable unit. In one respect of my invention, suitable guide means are provided for determining the predetermined course of movement of the removable unit with respect to the stationary unit, and the aforementioned interlock elements in combination with such guide means are arranged to permit mounting of the removable unit only in the event that it has a predetermined orientation with respect to the stationary unit.

My invention will be better understood and its various objects and advantages will be more fully appreciated from the following description taken in conjunction with the accompanying drawings in which:

Figure 1 is a perspective view of a plug-in type electric busway section;

Figure 2 is a perspective view of a removable tap-off unit constructed in accordance with one embodiment of my invention;

Figure 3 is a side elevation of a typical installation of a removable tap-off unit mounted on the busway;

Figure 5 is a perspective view, partly exploded, of a portion of the inside of the tap-off unit illustrating typical means for actuating an interlock element of my invention.

Figure 4:
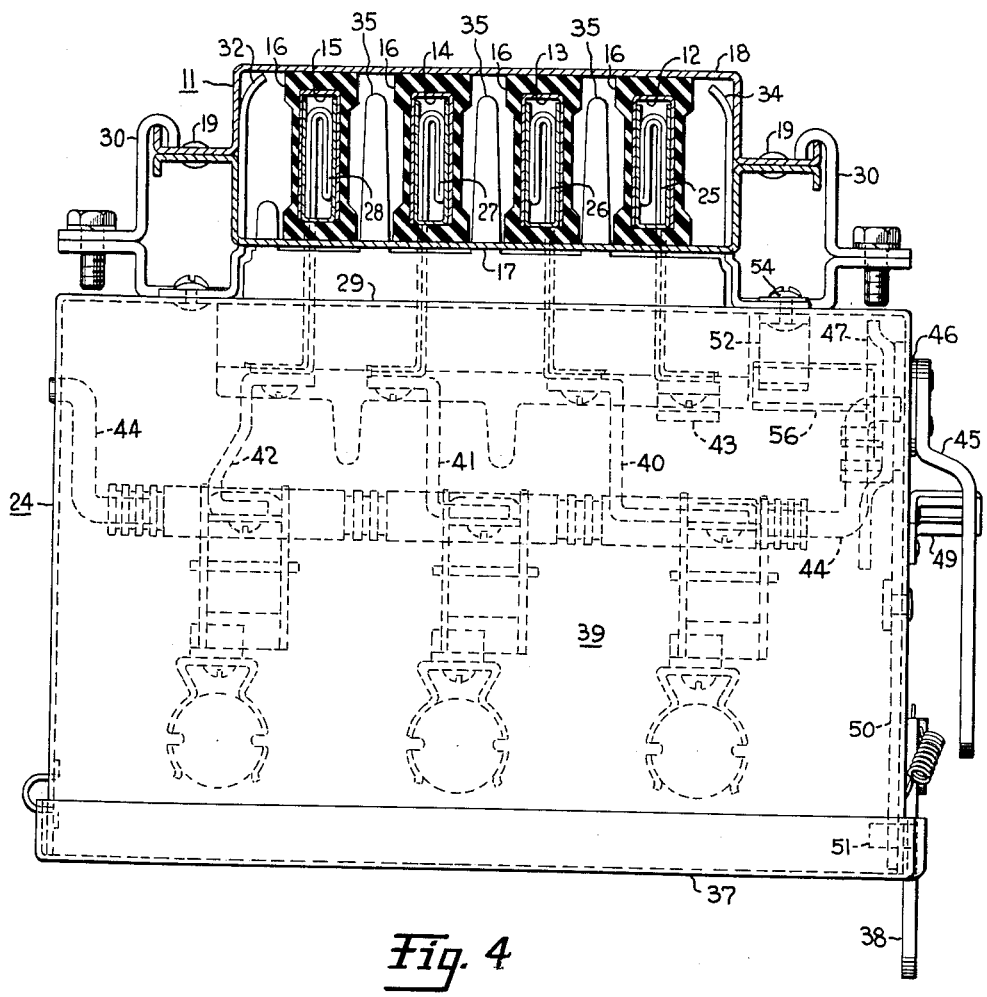
Figure 4 is an enlarged sectional view taken along line 4—4 of Figure 3 with the operating handle of the tap-off device moved to its "off" position.

Referring now to Figure 1, I have shown for the purpose of illustration a 3-phase 4-wire electric power distribution system or busway comprising a relatively stationary unit 11 housing four spaced-apart elongated conductors or bus bars 12, 13, 14, and 15. The bus bars 12—15 comprise a source of polyphase alternating current, with bus bar 12 specifically serving as the neutral conductor. Each of the bus bars is individually covered by butylic insulation 16 or the like for its entire length, and the insulated bus bars are supported within a sheet metal enclosure by suitable means, not shown.

In the illustrated embodiment of my invention, the sheet metal enclosure for the bus bars 12—15 of the source unit or busway 11 comprises top and bottom cover plates 17 and 18, respectively, of roll-formed sheet steel. Each cover plate in section is a wide channel having relatively narrow flanges, and the cover plates 17 and 18 are rigidly fastened together in inverted relation by appropriate rivets 19 or the like in their corresponding flanges. It is apparent in Figure 1 that the cooperating flanges of the top and bottom cover plates 17 and 18 provide a continuous rail for attaching suitable busway hangers at any point along the length of the busway 11. The opposite sides of the cover plates 17 and 18 define the sidewalls of the busway enclosure.

As is clearly shown in Figure 1, the cover plate 17 of the busway enclosure is provided with a generally rectangular aperture 20 for providing limited access to the enclosed bus bars 12—15. In this manner an outlet is provided for a power tap-off unit. A sliding metal cover 21 is disposed to cover the aperture 20 when this outlet is not being used. Suitable clamping means 22 located on the flanges of the cover plates 17 and 18 are used for releasably clamping the sliding cover 21 over aperture 20.

As indicated in Figure 1, the bus bars 12—15 preferably comprise hollow tubular conductors having oblong cross sections. A portion of the insulation 16 of each bus bar is removed and the bus bar is slotted at 23 where it is exposed by the aperture 20. The inner surfaces of each bus bar adjacent the slot 23 serve as relatively stationary disconnect contacts associated with the busway 11 for engagement by cooperating blade-like plug-in type disconnect contacts of the tap-off unit.

Turning now to Figure 2, a separate tap-off unit 24 is shown comprising a reciprocally movable sheet metal housing which encloses an appropriate tap-off device, such as a circuit breaker or set of fuses, for controlling the supply of electric power to an individual utilization circuit, not shown. The unit 24 in the illustrated embodiment of my invention includes four plug-in type disconnect contacts 25, 26, 27 and 28 projecting from the rearwall 29 thereof and connected inside the unit to a 4-wire utilization circuit via a multipole tap-off device. Movement of the tap-off unit 24 along a predetermined linear course enables this unit to be removably mounted and dismounted with respect to the relatively stationary busway 11, and during such movement of the removable unit, the plug-in type disconnects 25—28 enter the busway through aperture 20 to respectively effect engagement and disengagement with the slotted bus bars 12—15. While I have shown blade-like disconnects on the removable unit 24 for insertion into the respective slots 23 of the bus bars in busway 11, it will be understood that cooperating contacts of different form could be used to perform the disconnect function.

The removable unit 24 has mounted on its rearwall 29 a pair of hook-on type hangers 30 and a spacer bracket 31. The hangers 30 are adapted to hook over the cooperating flanges of the cover plates 17 and 18 of the busway 11, and in this manner the removable unit is firmly secured in its mounted position on the busway over aperture 20, as is shown in Figures 3 and 4.

The predetermined course followed by the removable unit during mounting and dismounting thereof is determined by suitable guide means which may take any form, but which preferably comprises a cantilever member 32 mounted on the rearwall 29 of the removable unit 24 in cooperation with the aperture 20 in the relatively stationary unit 11. As can be seen in Figure 1, the cover plate 17 at one corner of the aperture 20 is provided with a recess or notch 33, and the cantilever member 32 is received in the corresponding enlarged end of the aperture 20. The removable unit 24 can be mounted on busway 11 only if cantilever member 32 is in alignment with this cooperating opening in cover plate 17. The purpose of this arrangement is to ensure that as the removable unit 24 is mounted on the busway 11 the disconnect contacts 25—28 will be in line with the slots 23 of the bus bars 12—15.

The cantilever member 32 is one of a plurality of barriers mounted on the rearwall 29 of the removable unit 24 adjacent the disconnect contacts 25—28 and projecting toward the busway generally parallel to the predetermined course of movement of the removable unit for insertion through aperture 20. Member 32 comprises one of the end barriers as is shown in Figure 2. Another cantilever member 34 comprises the other end barrier, and each of the intermediate barriers is identified in the drawings by the reference number 35. These barriers are disposed to project through the aperture 20 into the busway 11 alongside of the bus bars 12—15, and as is most clearly seen in Figure 4, the two end barriers 32 and 34 slidably engage the opposite sidewalls of the sheet metal enclosure of the busway.

The end barriers 32 and 34 may be constructed of either electric insulating or conducting material. By using electro-conductive materials, these two barriers which frictionally contact the sidewalls of the grounded unit 11 provide convenient means for ensuring that the removable unit 24 is grounded before the respective disconnect contacts engage during a mounting operation. The same result is achieved by adding an appropriate metal strap (not shown) to the outer side of either one of the end barriers 32 or 34 if these barriers are made of insulating material. The end barriers also act as shields for the disconnect contacts 25—28 and protect them from damage during handling of the removable unit 24.

In accordance with my invention, one of the cantilever barriers 34 or 35 is movably mounted on the removable unit 24 and is provided with an enlarged free end or head. I have found it particularly advantageous to select the end barrier 34 for this purpose, and as is best seen in Figure 5 the free end 36 of this cantilever member has been appropriately enlarged. The member 34 is disposed for movement in a plane generally perpendicular to the predetermined course of movement of the unit 24, and it can be moved in this plane between two different positions relative to unit 24. In Figures 2, 4 and 5 member 34 is shown in a first one of its two positions, and in Figure 3 this member is shown in its other position. Movement of the member 34 is controlled by suitable actuating means which will be described hereinafter.

In the preferred embodiment of my invention illustrated in the drawings by way of example, barrier 34 is disposed on the removable unit 24 for rectilinear sliding movement in a direction generally parallel to the lengthwise direction of the bus bars 12—15 of busway 11, and the head 36 has been enlarged by extending its length without changing its thickness. Thus, as can be seen most clearly in Figure 5, barrier 34 is a generally flat L-shape piece supported at one end for edgewise movement. The enlarged head 36 preferably has a different cross-sectional configuration than barrier 32, and this has been accomplished in the illustrated embodiment of the invention by making head 36 of barrier 34 shorter than barrier 32.

The barrier 34 supported by the removable unit 24 comprises one interlock element of my invention. Another cooperating interlock element is provided in effect by the apertured cover plate 17 fixedly associated with the busway 11. The aperture 20 is appropriately configured and disposed with respect to barrier 34 for admitting the enlarged head 36 of the barrier during mounting and dismounting of the removable unit 24, and the entire head 36 is received by aperture 20 and contained within busway 11 with unit 24 mounted thereon. However, the head of barrier 34 registers with and passes through the aperture 20 as the unit 24 is moved along its predetermined course for mounting and dismounting only if the barrier 34 is in its first position shown in Figures 2, 4 and 5. Upon movement of barrier 34 to its other position, the head 36 is out of register with aperture 20 and mounting or dismounting of the removable unit 24 is positively prevented. For example, as is clearly indicated in Figure 3, the unit 24 cannot be appreciably moved along its predetermined course for the purpose of dismounting until barrier 34 has been moved to its first position wherein enlarged head 36 registers with aperture 20.

The cooperating interlock elements described above are coordinated with the disconnect contacts 25—28 of unit 24 in cooperation with the bus bars 12—15 of busway 11 so that engagement and disengagement of the bus bars by the respective contacts 25—28 is effected while the enlarged head 36 is passing through the aperture 20. By suitably arranging the actuating means for barrier 34, this barrier can be positioned out of register with aperture 20 in response to the tap-off device enclosed in unit 24 being in a closed circuit position, whereby mounting or removal of the unit 24 is prevented and neither engagement nor disengagment of the cooperating disconnect contacts can take place. Thus, energization and deenergization of the utilization circuit being supplied by the tap-off device cannot be effected by the cooperating disconnect contacts of the plug-in type busway.

It will be noted that the guide means comprising end barrier 32 in combination with the interlock element comprising end barrier 34 act to ensure that the removable unit 24 can be mounted on busway 11 only if it has a predetermined orientation with respect to the busway. If the unit 24 were improperly oriented, barrier 32 would be out of alignment with the notched end (33) of aperture 20 and would therefore block movement of unit 24 to a mounted position. In this manner, proper polarization of the tap-off device is obtained, i.e., the disconect 25 will always engage the neutral bus bar 12, the disconnect 26 will always engage bus bar 13, and so forth.

The removable unit 24 is provided with a hinged access door 37 which is held closed by a spring latch 38. Inside the unit 24 is mounted a suitable tap-off device such as the conventional 3-pole fused safety switch 39 illustrated in Figure 4. The three poles of the switch 39 are respectively connected by conducting straps 40, 41 and 42 to the disconnect contacts 26, 27 and 28, and a neutral conductor 43 is connected to the disconnect contact 25. A suitable 4-wire utilization circuit (not shown) is connected to the switch 39, and the supply of electric current to this utilization circuit is controlled by the switch.

An operating mechanism is provided for switch 39 comprising a crank bar 44 journaled on opposite sidewalls of unit 24 and connected to a movable contact of each pole of the switch for reciprocally throwing the switch contacts to "off" and "on" positions. Movement of the crank bar 44 is governed by an operating handle 45 disposed on the outside of the unit 24 and rotatably connected to a sidewall thereof by means of a bushing 46, as can be seen most clearly in Figures 4 and 5. Inside the unit 24 a rotatable generally disk-shaped member 47 connected to an overcenter compression spring 48 is rigidly fastened to the bushing 46 for movement therewith, and as shown in Figure 5 a lost motion coupling is provided between member 47 and the crank bar 44 in order to obtain snap-action opening and closing of the switch contacts. The operating handle 45 is arcuately movable through 90 angular degrees between "on" and "off" positions, and in its "off" position it rests against a stop lug 49 fastened to the sidewall of unit 24 as is shown in Figures 2, 3 and 4. A pivotally mounted spring biased interlock member 50 is provided in cooperation with a pin 51 of door 37 and the switch operating mechanism for locking the door 37 closed whenever the safety switch 39 is in its closed circuit or "on" position.

In order to actuate the movably mounted interlock barrier 34 in accordance with the circuit condition of the switch 39 enclosed in unit 24, suitable actuating means such as a sliding bar 52 having a generally U-shaped upstanding portion 53 is provided. The bar 52 is disposed inside unit 24 adjacent the rearwall 29 and is connected to barrier 34 by two pins 54. The pins 54 are respectively confined in a pair of colinear elongated slots 55 located in rearwall 29, and in this maner the barrier 34 is supported by unit 24 for rectilinear sliding movement between two different positions. An L-shaped actuating member 56 having one leg affixed to the disk-shaped member 47 and hence to handle 45 is disposed for engagement with opposing sides of the U-shaped portion 53 of bar 52. See Figure 5.

In Figure 5 the operating mechanism for safety switch 39 is shown in its "off" position, and actuating member 56 has moved the bar 52 and hence barrier 34 to its first position in which the removable unit 24 can be freely mounted or dismounted with respect to busway 11. Rotation of the operating handle 45 to its "on" position will carry actuating member 56 through an arcuate path to slide the bar 52 and hence the barrier 34 to its other position (shown dotted in Figure 5) wherein mounting or dismounting of the removable unit is positively prevented in the manner already described. If desired, suitable spring means could be provided for normally biasing the bar 52 and barrier 34 to this latter position. Although I have shown and described one specific arrangement for actuating my interlock, it will be understood by those skilled in the art that there are many other means equally well suited for actuating the interlock, and the particular means selected does not affect the cooperation or the operation of the interlock elements described in detail hereinbefore.

While I have shown and described a preferred form of my invention by way of illustration, many modifications will occur to those skilled in the art. Therefore, I contemplate by the concluding claims to cover all such modifications as fall within the true spirit and scope of my invention.

What I claim as new and desire to secure by Letters Patent of the United States is:

1. In combination: a unit housing a source of electric power; a separate unit housing a tap-off device; said units being disposed for relative movement along a predetermined course to provide for the mounting and dismounting of the tap-off unit with respect to the source unit; a pair of cooperating disconnect contacts associated each in fixed relationship with the source and tap-off units, respectively, said contacts being engaged and disengaged by relative movement of the units along said predetermined course during mounting and dismounting, respectively, of the tap-off unit; a first interlock element mounted on the tap-off unit and disposed for movement between two different positions relative to the tap-off unit in a plane generally perpendicular to said predetermined course; actuating means connected to the first interlock element for controlling its movement; and a second cooperating interlock element fixedly associated with the source unit; one of said interlock elements comprising a cantilever member projecting from its associated unit generally parallel to said predetermined course and having an enlarged free end and the other interlock element comprising a plate having an aperture adapted to receive said enlarged end, said interlock elements being disposed with respect to each other so that during mounting or dismounting of the tap-off unit said enlarged end registers with said aperture only if the first element is in a predetermined one of its two positions.

2. In combination: a unit housing a source of electric power; a separate unit housing a tap-off device movable along a predetermined course for mounting and dismounting with respect to the source unit; a pair of cooperating disconnect contacts associated each in fixed relationship with the source and tap-off units, respectively, engagement and disengagement of said contacts being respectively effected by reciprocative movement of the tap-off unit along said predetermined course during mounting and dismountnig thereof; a first interlock element mounted on the tap-off unit and disposed for movement between two different positions relative to the tap-off unit in a plane generally perpendicular to said predetermined course; actuating means connected to the first interlock element for controlling its movement; and a second cooperating interlock element fixedly associated with the source unit; one of said interlock elements comprising a cantilever member projecting from its associated unit generally parallel to said predetermined course and having an enlarged free end and the other interlock element comprising a plate having an aperture for admitting said enlarged end, said interlock elements being disposed with respect to each other so that during mounting or dismounting of the tap-off unit said enlarged end registers with said aperture only if the first element is in a predetermined one of its two positions, said interlock elements being coordinated with the disconnect contacts so that engagement and disengagement of said contacts is effected while said enlarged end is passing through said aperture.

3. In combination: a sheet metal unit enclosing a source of electric power; a separate sheet metal unit enclosing a tap-off device reciprocally movable along a predetermined course for mounting and dismounting with respect to the source unit; a pair of plug-in type disconnect contacts associated each in fixed relationship with the source and tap-off units, respectively; a first interlock element movably mounted on the tap-off unit comprising a cantilever member projecting toward the source unit generally parallel to said predetermined course and having an enlarged free end, said cantilever member being disposed for rectilinear movement in a direction generally perpendicular to said predetermined course between two different positions relative to the tap-off unit; actuating means connected to the cantilever member for controlling its movement; and a second interlock element comprising an aperture in a wall of the source unit for admitting the entire enlarged end of the cantilever member; said interlock elements being disposed so that said enlarged end registers with and passes through said aperture during mounting and dismounting of the tap-off unit with said cantilever member in a predetermined one of its two positions and so that said enlarged end is moved out of register with said aperture to prevent mounting or dismounting of the tap-off unit when said cantilever member is moved to its other position.

4. In an alectric power distribution system; a relatively stationary unit enclosing a plurality of spaced-apart elongated bus bars and having an aperture for providing limited access to the enclosed bus bars; a removable unit enclosing a multipole tap-off device mounted on the stationary unit over said aperture; said removable unit having projecting therefrom a plurality of fixedly mounted plug-in type disconnect contacts disposed to enter the stationary unit through said aperture for respectively engaging the bus bars; a projecting barrier mounted on the removable unit adjacent one of the disconnect contacts and having an enlarged head insertable through said aperture into the stationary unit, said barrier being disposed for rectilinear sliding movement in a direction generally parallel to the lengthwise direction of the bus bars between first and second positions relative to the removable unit; and actuating means connected to said barrier for controlling its movement; said barrier and said aperture being coordinated so that the head of said barrier registers with said aperture and the removable unit can be removed from the stationary unit only when said barrier is in its first position.

5. In an electric power distribution system: a unit housing a source of electric power; a separate unit housing a tap-off device; said units being disposed for relative reciprocation along a predetermined course to provide for the mounting and dismounting of the tap-off unit with respect to the source unit; guide means associated with said units for determining said predetermined course; at least two pairs of cooperating disconnect contacts, the contacts of each pair being associated in fixed relationship with the source and tap-off units, respectively, for engagement upon relative movement of the units along said predetermined course during mounting of the tap-off unit; a first interlock element supported by the tap-off unit and disposed for movement between two different positions relative to the tap-off unit in a plane generally perpendicular to said predetermined course; actuating means connected to the first interlock element for controlling its movement; and a second cooperating interlock element fixedly associated with the source unit; one of said interlock elements comprising a cantilever member projecting from its associated unit generall parallel to said predetermined course and having an enlarged free end and the other interlock element comprising a plate having an aperture for admitting said enlarged end, said interlock elements being disposed so that said enlarged end registers with said aperture during an attempted mounting of the tap-off unit only if the first element is in a predetermined one of its two positions and said tap-off unit has a predetermined orientation with respect to the source unit.

6. In an electric power distribution system: a sheet metal unit enclosing a source of electric power; a separate sheet metal unit enclosing a multipole tap-off device reciprocally movable along a predetermined course for mounting and dismounting with respect to the source unit; guide means for determining said predetermined course comprising a first cantilever member fixedly mounted on the tap-off unit and a cooperating opening in the source unit for receiving said first member; at least two pairs of cooperating disconnect contacts, the contacts of each pair being associated in fixed relationship with the source and tap-off units, respectively; a first interlock element movably mounted on the tap-off unit comprising another cantilever member projecting toward the source unit generally parallel to said predetermined course and having an enlarged free end of different cross-sectional configuration than said first cantilever member, said first interlock element being disposed for movement in a plane generally perpendicular to said predetermined course between two different positions relative to the tap-off unit; actuating means connected to the first interlock element for controlling its movement; and a second interlock element comprising an aperture in the source unit adapted to admit the enlarged end of said first interlock element; said interlock elements being disposed so that said enlarged end registers with said aperture, thereby permitting mounting of the tap-off unit, only with said first interlock element in a predetermined one of its two positions and with said first cantilever member in alignment with its cooperating opening.

7. In a polyphase electric power distribution system: a relatively stationary busway comprising a plurality of spaced-apart elongated bus bars in a sheet metal enclosure having an aperture for providing limited access to the bus bars; a removable unit enclosing a multipole tap-off device mounted on the busway over said aperture; said removable unit having projecting therefrom a plurality of fixedly mounted plug-in type disconnect contacts disposed to enter the busway through said aperture for respectively engaging the bus bars; a plurality of barriers mounted on the removable unit adjacent the disconnect contacts and disposed to project through said aperture into the busway along side the bus bars, the two end barriers of the removable unit being respectively disposed in the busway in sliding engagement with opposite sidewalls of said sheet metal enclosure, a first one of said end barriers being slidably mounted on the removable unit for rectilinear movement in a direction generally parallel to the lengthwise direction of the bus bars between two different positions relative to the removable unit, said first barrier having an enlarged head entirely contained within said enclosure and disposed to register with said aperture only when said first barrier is in a predetermined one of its two positions, whereby dismounting of the removable unit is prevented as long as said first barrier is in its other position; and actuating means connected to said first end barrier for controlling its rectilinear movement.

8. In an electric power distribution system: a relatively stationary busway comprising a plurality of spaced-apart elongated bus bars in a sheet metal enclosure having an aperture for providing limited access to the bus bars; a removable unit comprising a metallic housing with a multi-pole tap-off device mounted therein, said unit being mounted on the busway over said aperture; said removable unit having projecting therefrom a plurality of aligned and fixedly mounted plug-in type disconnect contacts disposed to enter the busway along a predetermined course through said aperture for respectively engaging the bus bars; a plurality of barriers mounted on the removable unit adjacent the disconnect contacts and disposed to project through said aperture into the busway along side the bus bars, the two end barriers of the removable unit being formed of electrically conductive material in electrical contact with said metallic housing and respectively disposed in the busway in sliding engagement with opposite walls of said sheet metal enclosure to guide said contacts in their predetermined course and to ground said housing to said enclosure, a first one of said end barriers being slidably mounted on the removable unit for rectilinear movement in a direction generally perpendicular to said predetermined course between two different positions relative to the removable unit, said first barrier having an enlarged head entirely contained within said enclosure and disposed to register with said aperture only when said first barrier is in a predetermined one of its two positions, whereby dismounting of the removable unit is prevented as long as said first barrier is in its other position; and actuating means connected to said first end barrier for controlling its rectilinear movement.

References Cited in the file of this patent

UNITED STATES PATENTS

| | | |
|---|---|---|
| 1,910,036 | Moreines | May 23, 1933 |
| 1,959,903 | Cassidy | May 22, 1934 |
| 2,007,911 | Normann | July 9, 1935 |
| 2,173,062 | Hammerly | Sept. 12, 1939 |
| 2,231,056 | De Mask | Feb. 11, 1941 |
| 2,326,692 | Shilpey | Aug. 10, 1943 |
| 2,786,908 | Constantine | Mar. 26, 1957 |
| 2,861,139 | Platz | Nov. 18, 1958 |
| 2,876,389 | Lang | Mar. 3, 1959 |
| 2,902,555 | Herrmann | Sept. 1, 1959 |